United States Patent
Allinder

(10) Patent No.: US 7,385,832 B2
(45) Date of Patent: Jun. 10, 2008

(54) METHOD OF FORMING A SECONDARY-SIDE CONTROLLER AND STRUCTURE THEREFOR

(75) Inventor: Terry Allinder, Mesa, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 77 days.

(21) Appl. No.: 11/479,164

(22) Filed: Jul. 3, 2006

(65) Prior Publication Data

US 2008/0002441 A1    Jan. 3, 2008

(51) Int. Cl.
*H02M 3/335*    (2006.01)
*H02M 7/217*    (2006.01)

(52) U.S. Cl. .............................. 363/21.14; 363/21.18; 363/127

(58) Field of Classification Search ............. 363/21.01, 363/21.06, 21.11, 21.12, 21.14, 21.17, 97, 363/131, 127
See application file for complete search history.

(56) References Cited

U.S. PATENT DOCUMENTS

| | | | |
|---|---|---|---|
| 6,198,638 B1 | 3/2001 | Lee | |
| 6,373,727 B1 | 4/2002 | Hedenskog et al. | |
| 6,418,039 B2 | 7/2002 | Lentini et al. | |
| 6,466,462 B2 * | 10/2002 | Nishiyama et al. | 363/21.11 |
| 6,535,400 B2 | 3/2003 | Bridge | |
| 6,597,221 B2 | 7/2003 | Hall et al. | |
| 6,812,682 B2 | 11/2004 | Hachiya | |
| 6,813,166 B1 | 11/2004 | Chang et al. | |
| 6,912,143 B2 * | 6/2005 | Gan et al. | 363/89 |
| 6,949,917 B2 * | 9/2005 | Umemoto et al. | 323/286 |
| 7,262,977 B2 * | 8/2007 | Kyono | 363/21.06 |
| 2005/0248964 A1 | 11/2005 | Dalal | |
| 2007/0216372 A1 * | 9/2007 | Weng et al. | 323/222 |

* cited by examiner

*Primary Examiner*—Gary L Laxton
(74) *Attorney, Agent, or Firm*—Robert F. Hightower

(57) ABSTRACT

In one embodiment, a secondary-side controller is configured to detect a burst-mode of operation and responsively block or prevent sending drive pulses to a power transistor that is coupled in the secondary side.

16 Claims, 3 Drawing Sheets

METHOD OF FORMING A SECONDARY-SIDE CONTROLLER AND STRUCTURE THEREFOR

CROSS-REFERENCE TO RELATED APPLICATIONS

This application is related to United States patent publication No. 2005/0248964 entitled "POWER SUPPLY CONTROLLER AND METHOD THEREFOR" by inventor Dhaval Dalal and having a publication date of Nov. 10, 2005 and a common assignee which is hereby incorporated herein by reference.

BACKGROUND OF THE INVENTION

The present invention relates, in general, to electronics, and more particularly, to methods of forming semiconductor devices and structure.

In the past, various circuits and methods were utilized to control synchronous rectifiers in power supply systems. Usually, the control methods depended on the operating mode and the type of power supply system. Flyback type power supply systems usually required complex control circuits. In a flyback converter, the current through a primary coil of a transformer was terminated in order to cause the magnetic field to collapse and couple power to a secondary inductor of the transformer. In the flyback converter, the synchronous rectifier typically was in the secondary side of the power supply system and the switching power supply controller was in the primary side of the power supply system. One method of operating a flyback converter system utilized a fixed frequency clock to predict the time in which the synchronous rectifier should be enabled or disabled. An example of such a flyback system was disclosed in U.S. Pat. No. 6,418,039 issued to Franco Lentini et al on Jul. 9, 2002. Complicated circuitry was required to implement the control. The complicated circuitry increased the system cost. Additionally, some flyback systems also included burst-mode operation to reduce power dissipation during light load conditions. It was difficult to accurately predict the proper time to enable and disable the synchronous rectifier, thus, the operation was inefficient.

Accordingly, it is desirable to have a control method and circuit that accurately controls a secondary side synchronous rectifier, that does not require complicated circuitry, and that has a low cost.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
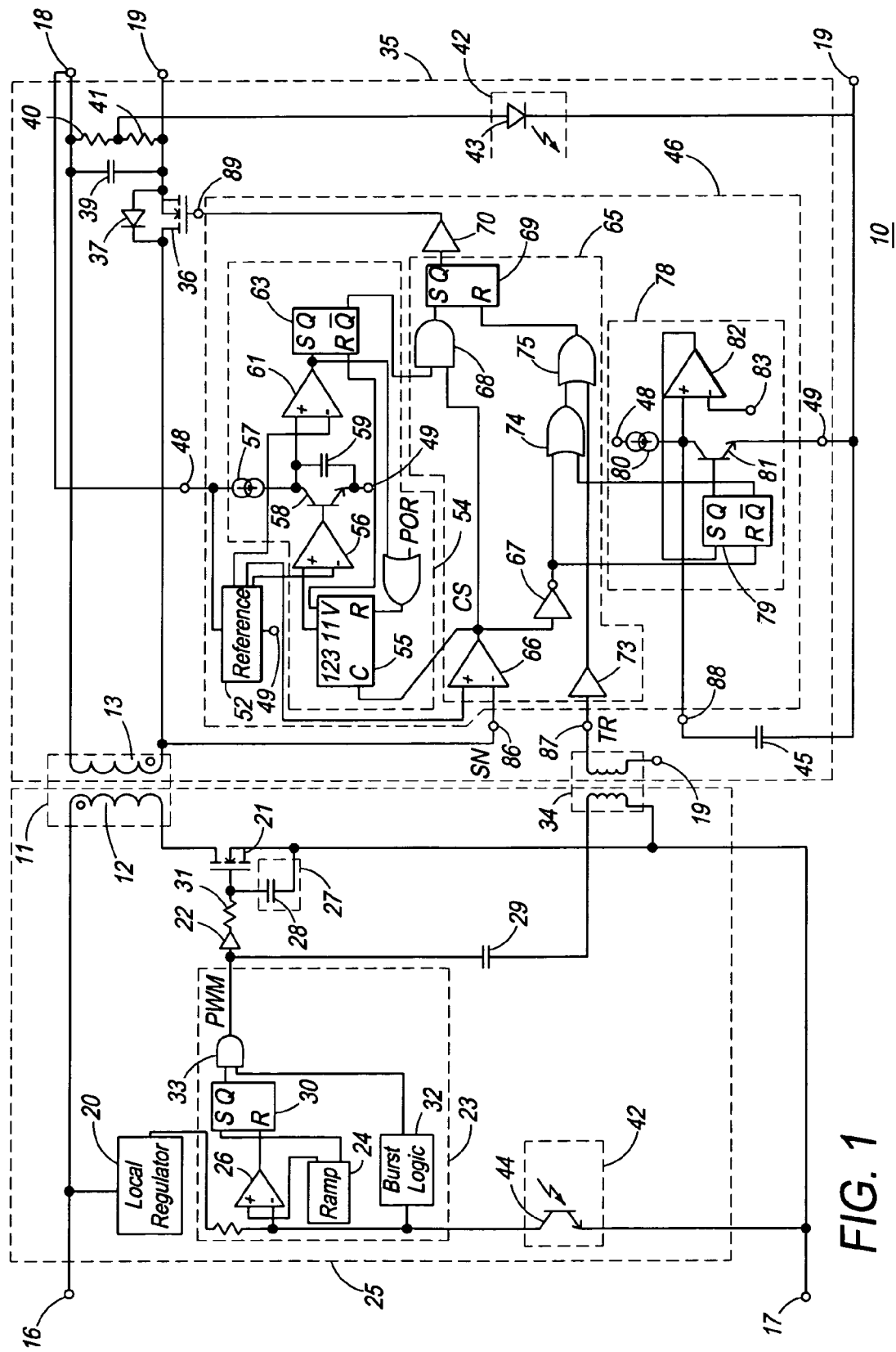
FIG. 1 schematically illustrates an embodiment of a portion of a power supply system having a secondary-side controller in accordance with the present invention.

FIG. 1 schematically illustrates an embodiment of a portion of a power supply system 10 that includes a secondary-side power supply controller 46. As will be seen further hereinafter, controller 46 detects that system 10 is operating in a burst-mode of operation and responsively block or prevent sending drive pulses to a power transistor that is coupled in the secondary side. Blocking the drive pulses disables the power transistor. Controller 46 senses current flow in the secondary-side in order to detect the burst-mode of operation. Power supply system 10 includes a transformer 11 that has a primary side inductor 12 and a secondary side inductor 13. Typically, elements connected to primary side inductor 12 are electrically isolated from elements connected to secondary side inductor 13. Consequently, system 10 is regarded as having a primary side 25 that is electrically isolated from a secondary side 35. System 10 receives power, such as a full wave rectified voltage, between a power input terminal 16 and a power return terminal 17, and generates an output voltage between an output terminal 18 and an output common terminal 19. System 10 controls the current flow through primary side inductor 12 in order to regulate the value of the output voltage formed between terminals 18 and 19. A power switch is connected to primary side inductor 12 in order to control the amount of current and the timing of the current flowing through inductor 12. In the preferred embodiment, the power switch is a power metal oxide semiconductor (MOS) transistor 21. In other embodiments, the power switch may be a bipolar transistor or other power switch element that is well known to those skilled in the art. A switching controller within primary side 25 is utilized to create a control signal to control the power switch and the current flow through inductor 12. Typically, the switching controller is a pulse width modulated (PWM) controller 23 that includes a ramp generator or ramp 24, a PWM comparator 26, a PWM latch 30, a burst-mode logic 32, and a burst mode AND gate 33. Ramp 24 has a first output that generates a clock signal (CK) and a second output that generates a ramp signal. The clock signal (CK) from ramp 24 is used to set PWM latch 30. Comparator 26 receives the ramp signal from ramp 24 and also receives a feedback signal that is representative of the value of the output voltage formed between terminals 18 and 19. The output of comparator 26 resets latch 30. PWM controller 23 generates a PWM control signal that is utilized to control transistor 21. The output of latch 30, thus, the output of controller 23 forms the PWM control signal which is labeled as PWM in FIG. 1. Under light load conditions the load current required by the load (not shown) connected to terminals 18 and 19 may decrease. In such a case, it may be desirable to reduce the number of drive pulses to transistor 21 in order to improve the efficiency of system 10. Burst logic 32 is configured to detect such a light load condition and change the operating mode of controller 23 to the burst-mode. In the burst-mode, controller 23 reduces the load current supplied to the load in response to the decreased load current required but continues regulating the output voltage to the desired output voltage value. In the burst-mode, controller 23 provides sets of drive pulses to transistor 21 and controls the width of the drive pulses within each set to improve the operating efficiency of system 10. Controller 23 typically skips pulses that would normally be between the sets of pulses. Burst-mode is sometimes also referred to as skip-cycle mode. Such PWM controllers are well known to those skilled in the art. Examples of PWM controllers that include operation in the burst-mode or skip-cycle mode includes U.S. Pat. No. 6,597,221 issued to Hall et al on Jul. 22, 2003 and U.S. Pat. No. 6,812,682 issued to Yoshiaki Hachiya on Nov. 2, 2004.

In the exemplary embodiment of primary side 25 that is illustrated in FIG. 1, a driver 22 receives the PWM control signal from controller 23. A delay element 27 is connected to the output of driver 22 to create a delay between the PWM control signal from controller 23 and the signal used to drive transistor 21. Thus, the signal used to drive transistor 21 is referred to as a delayed PWM drive signal. The delay element can be a capacitor and resistor, such as a capacitor 28 and a resistor 31, although other elements may be utilized to create the delayed PWM drive signal. In some embodiments, the gate capacitance of transistor 21 may be sufficient to provide the desired delay. Primary side 25 may also include a local regulator 20 that generates an operating voltage to operate elements within primary side 25, including PWM controller 23 and driver 22. Although not shown for clarity of the drawings, local regulator 20 is connected between terminals 16 and 17 in order to receive power.

Secondary-side 35 includes another MOS transistor 36 connected to function as a synchronous rectifier in series with inductor 13. A diode 37 represents the body diode of transistor 36. Secondary-side 35 also includes secondary-side power supply controller 46 that assists in enabling and disabling transistor 36. System 10 also usually includes an energy storage capacitor 39 and an optical coupler 42 that is used to generate the feedback signal for PWM controller 23. Optical coupler 42 has a light emitting diode 43 connected to receive the output voltage. Typically, a voltage divider, such as the voltage divider formed by resistors 40 and 41, is used to reduce the voltage from terminals 18 and 19 prior to applying the voltage to coupler 42. Coupler 42 also includes a phototransistor 44 that receives light from diode 43 and responsively generates the feedback signal that is received by controller 23. Because of the optical coupling between diode 43 and phototransistor 44, diode 43 and phototransistor 44 are typically regarded as being electrically isolated from each other. As connected in FIG. 1, diode 43 is a portion of secondary side 35 and phototransistor 44 is a portion of primary side 25. System 10 also usually includes a signal isolation device 34 that is used to couple the PWM control signal from primary side 25 to secondary side 35 as a trigger signal (TR) that is representative of the PWM control signal. Device 34 typically is a signal transformer having a primary side connected to receive the PWM control signal and a secondary side to which the PWM control signal is coupled through the magnetic coupling of the transformer. Device 34 may also be other types of signal isolation and coupling elements such as an optical coupler. A capacitor 29 may be coupled in series between the output of controller 23 and the input of device 34 in order to provide a true ac signal at the input of the signal transformer.

When system 10 is operating in the burst-mode, it is desirable to minimize the power dissipation in secondary side 35. Controller 46 is configured to disable transistor 36 during at least a portion of the interval that system 10 is operating in the burst-mode. This assists in eliminating the power dissipated in transistor 36 thereby improving the efficiency during burst-mode operation. Controller 46 receives a synch signal (SN) on an input 86. As will be seen further hereinafter, the synch signal (SN) is used to determine if current is flowing in inductor 13. Controller 46 also receives the TR signal on an input 87, generates a drive signal to drive transistor 36 on an output 89, and provides a timing signal on an output 88. Controller 46 includes a burst-mode detector 54, a pulse generator 78, a switching section 65, and a driver 70. In most embodiments, driver 70 is formed to have a drive capacity sufficient to enable and disable transistor 36 in an efficient and timely manner. Switching section 65 includes a synchronization comparator 66, a latch 69, OR gates 74 and 75, an inverter 67, a driver 70, a receiver 73, and an inhibit AND gate 68. Receiver 73 receives the TR signal from device 34 and forms a signal that is used by controller 46. Receiver 73 preferably includes hysteresis in order to prevent false triggering of receiver 73. The exemplary embodiment of burst-mode detector 54 that is illustrated in FIG. 1 includes an 11-bit counter 55, a comparator 56, a timing capacitor 59, a current source 57, a discharge switch or transistor 58, a comparator 61, and a latch 63. Burst-mode detector 54 forms a burst-mode detect signal on a Q bar output of latch 63. Comparator 56, transistor 58, current source 57, capacitor 59, and comparator 61 form a timer that establishes a time interval that is used to assist in detecting operation in the burst-mode. Pulse generator 78 includes functions similarly to a one shot to form a set time interval upon receiving a positive level from inverter 67. The exemplary implementation of generator 78 includes a latch 79, a current source 80, a transistor 81, and a comparator 82. A capacitor 45 is used to assist in forming the set time interval and preferably is external to a semiconductor die on which controller 46 is formed. Controller 46 may also include a reference signal generator or reference 52 that forms various reference signals used by elements of controller 46. Reference 52 generates at least a first reference signal that is received by comparator 66, a second reference signal that is received by comparator 56, and a third reference signal that is received by a comparator 61.

Figure 2:
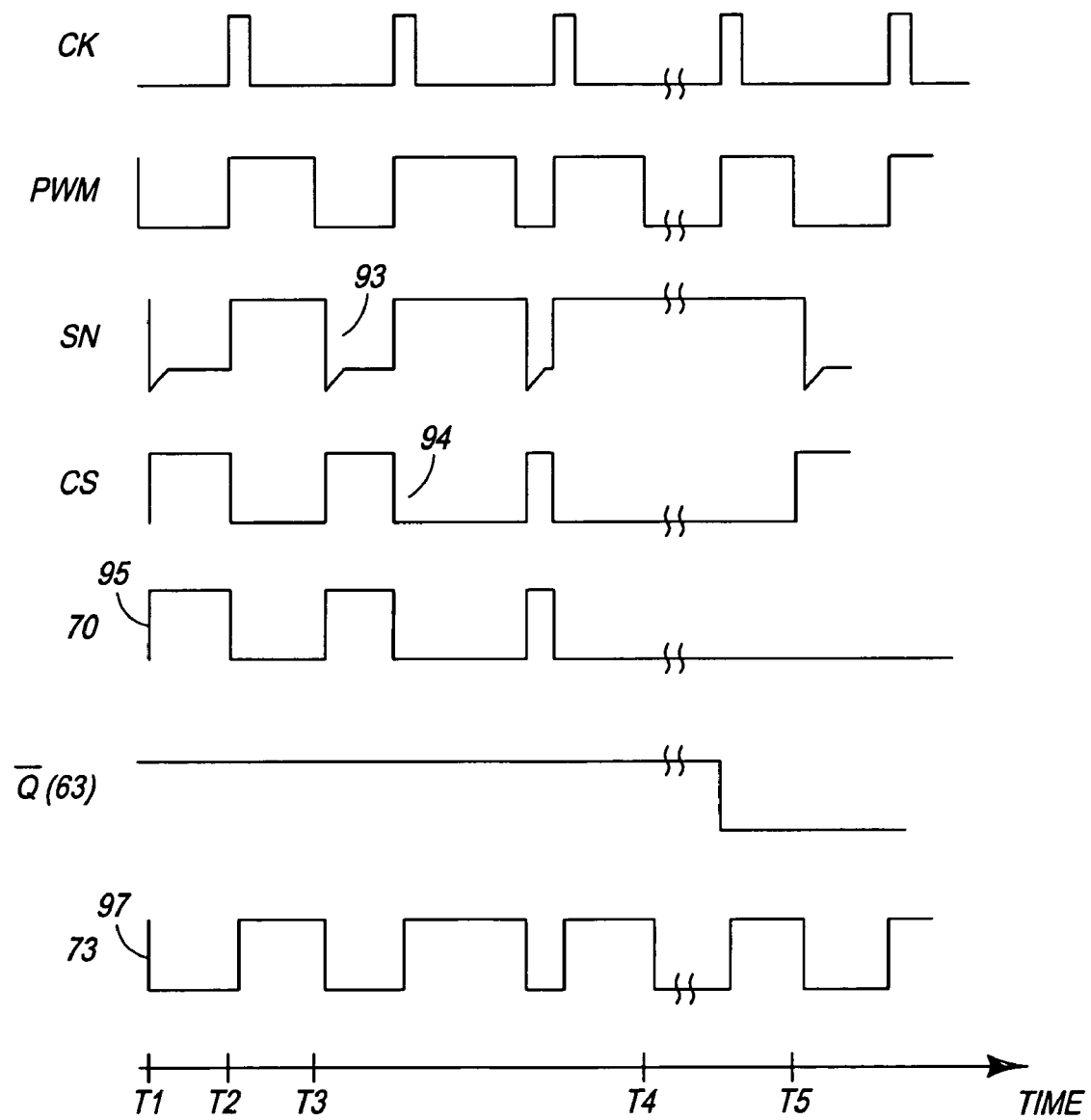
FIG. 2 is a graph having plots illustrating some of the signals of the system of FIG. 1 in accordance with the present invention.

FIG. 2 is a graph having plots that graphically illustrated some of the signals of system 10. The abscissa indicates time and the ordinate indicates increasing value of the illustrated signal. A plot 91 illustrates the clock signal (CK) from ramp 24 and a plot 92 illustrates the PWM signal from latch 30. A plot 93 illustrates the SN signal received on input 86. A plot 94 illustrates a CS signal on the output of comparator 66 and a plot 95 illustrates the drive signal on the output of driver 70. A plot 96 illustrates the Q bar output of latch 63 and a plot 97 illustrates the output of receiver 73. This description has references to FIG. 1 and FIG. 2.

In normal operation in the discontinuous conduction mode, not burst-mode operation, a positive edge of the CK signal sets latch 30 of controller 23 and forces the PWM signal high to enable transistor 21. Enabling transistor 21 causes current to flow in inductor 12 and store energy in the magnetic field of inductor 12. The high PWM signal from controller 23 also is coupled across device 34 and is received by receiver 73 thereby forcing the output of receiver 73 high.

The delay through capacitor 29 and device 34 causes the TR signal to lead the PWM signal thereby applying a reset signal to latch 69 and disabling transistor 36 through driver 70. At some point in the PWM cycle, the feedback signal becomes high enough to cause controller 23 to force PWM low as illustrated at a time T1 in FIG. 2. The low PWM signal forces the output of receiver 73 low after the delay of capacitor 29 and device 34. After the delay of element 27, transistor 21 is disabled. Disabling transistor 21 causes the magnetic field of inductor 12 to collapse and couple energy to inductor 13 which causes current to flow through inductor 13. The current through inductor 13 forces the SN signal low as illustrated by plots 93 and 94 at time T1. As the current begins to flow through inductor 13 and causes SN to go low, transistor 36 is not enabled so the current flows through body diode 37 which forces the voltage of signal SN below the voltage of terminal 19 by approximately the value of the threshold voltage of diode 37. Comparator 66 receives SN and forces the CS signal high responsively to the SN signal decreasing to a value of a first reference signal from reference 52 as illustrated by plot 94 at time T1. Assuming that latch 63 is set indicating that controller 46 has not detected burst-mode operation, the high CS signal forces the output of gate 68 high and sets latch 69. The high Q output of latch 69 forces the output of driver 70 high, as illustrated by plot 95, to begin enabling transistor 36. Enabling transistor 36 shorts out diode 37 and the voltage of the SN signal becomes substantially the value of terminal 19 as illustrated by plot 93 just after T1. At a time T2, CK again goes high and sets PWM to start another cycle of storing energy in inductor 12. The high PWM signal is coupled across device 34 to receiver 73 and forces the output high. The high from receiver 73 resets latch 69 through gate 75. Because of the delays through element 27, transistor 21 is still enabled and CS is still high, thus, the output of inverter 67 is low which prevents gate 74 from affecting the operation of latch 69. The low Q output of latch 69 forces the output of driver 70 low to disable transistor 36 which forces SN high and CS low. After the delay through element 27, transistor 21 is enabled. Consequently, the delay of element 27 allows transistor 36 to be disabled prior to enabling transistor 21 thereby improving the efficiency of system 10. At time T3, assume that the feedback signal becomes sufficient to reset latch 30 and force PWM low. After the delay through capacitor 29 and device 34, TR goes low. After the delay of element 27, transistor 21 is disabled and the energy from inductor 12 is coupled to inductor 13 to cause current to flow and force SN low. Thus, the cycle illustrated between T1 and T2 repeats.

In normal operation in the Continuous Conduction Mode, the current in inductor 13 (under normal system loading conditions) never falls to zero when transistor 36 is enabled. The PWM signal from controller 23 is coupled through device 34 as signal TR into input 87. Because the TR signal leads the enabling of transistor 21, TR can be used as a reset signal for latch 69, thereby preventing transistors 21 and 36 from being turned on at the same time.

Referring back to time T1, the high CS signal also is received by detector 54. Each rising edge of the CS signal increments counter 55. In parallel with the incrementing of counter 55, capacitor 59 is being charged by current source 57. In the preferred embodiment, counter 55 is an 11-bit counter that has an overflow signal that becomes set if counter 55 counts past the number that sets bit-11. In this preferred embodiment, counter 55 also includes a reset input that may be used to reset counter 55. In normal operation, counter 55 is incremented to the maximum value before capacitor 59 is charged to the value of the reference signal on the inverting input of comparator 61. Thus, bit-11 of counter 55 goes high before capacitor 59 charges. The high from bit-11 forces the output of comparator 56 high to enable transistor 58 and discharge capacitor 59. Thus, as long as detector 54 receives a sufficient number of CS signal edges before capacitor 59 charges, detector 54 does not form the burst-mode detect signal.

Assume that at a time T4, controller 23 begins operating in the burst-mode. As clock signal CK goes high, the PWM signal may not be generated for each CK cycle, thus, the number of CS signals generated by detector 54 for a given time period is reduced. If the number of CS pulses are sufficiently decreased, capacitor 59 charges to the value of the third reference signal from reference 52 before counter 55 discharges capacitor 59, thus, the output of comparator 61 goes high. The high from comparator 61 resets counter 55 and also sets latch 63. Setting latch 63 forces the Q bar output low to form the burst-mode detect signal. The low Q bar output forces the output of gate 68 low and prevents subsequent CS signals from enabling transistor 36. The next time that transistor 21 is disabled, illustrated at a time T5, SN goes low and CS is forced high. Since latch 63 is set, the output of gate 68 is low and the high CS signal is blocked from setting latch 69, thus, prevented from enabling transistor 36. The high CS signal also clocks counter 55. However, capacitor 59 is again charging in parallel with the incrementing of counter 55. If capacitor 59 again charges to the value of the second reference signal, the output of comparator 61 is again forced high and counter 55 is reset to zero and has to begin counting again. This sequence keeps repeating until the CS pulses are received fast enough to increment counter 55 and set bit-11 before capacitor 59 charges to the reference signal. If counter 55 does again reach a count that sets bit-11, the next CS signal forces the overflow bit (V) of counter 55 high which resets latch 63 and negates the burst-mode detect signal. Once the burst-mode detect signal is negated, operation again resumes as described between times T1 and T3. If the frequency of the CK signal is approximately one hundred kilo-hertz (100 KHz), then CS will also be approximately one hundred kilo-hertz (100 KHz) because CS is synchronized to CK. For such an example embodiment, the minimum time required to increment counter 55 and set bit-11 is approximately twenty milli-seconds (20 ms), and the time interval required to charge capacitor 59 to the value of the reference signal is approximately one hundred milli-seconds (100 ms).

When the system 10 is operating under light load conditions, such as operating in the burst-mode, the secondary voltage from inductor 13 may ring when there is no current flowing through inductor 13. If the ringing voltage drops near ground it may be possible to for comparator 66 to be falsely trigger providing a set input to latch 69. To ensure that transistor 36 is not prematurely enabled, the output of comparator 66 is connected to a logic block 78 with a time delay output on a Q bar output of a latch 79. Under normal operation, current begins to flow through inductor 13 and SN goes low forcing CS high and the output of inverter 67 low. The low from inverter 67 holds the reset input of latch 79 low. When the secondary current stops flowing in inductor 13, SN goes high and CS goes low forcing the output of inverter 67 high. The high from inverter 67 forces the reset input latch 79 high and also forces the reset input of latch 69 high through OR gates 74 and 75. When latch 79 is reset, this turns-off transistor 81 allowing external capacitor 45 to be charged by current source 80. When the voltage on capacitor 45 rises above the reference voltage connected to input 83 of comparator 82, the output of comparator 82 goes high setting the Q output of latch 79. The high from latch 79 turns-on transistor 81 discharging capacitor 45. During the time interval when capacitor 45 is charging, the reset input to latch 69 is held high. Since latch 69 is a reset dominate latch, the Q output is prevented from going high even if comparator 66 is falsely trigger by ringing of the SN signal on input 86.

In order to assist in implementing this functionality, input 86 of controller 46 is connected to a positive terminal of transformer 11 and to an inverting input of comparator 66. A non-inverting input of comparator 66 is connected to a first output of reference 52. The output of comparator 66 is commonly connected to a clock input of counter 55, an input of inverter 67, and a first input of gate 68. A second input of gate 68 is connected to the Q bar output of latch 63. The output of gate 68 is connected to the set input of latch 69. The Q output of latch 69 is connected to an input of driver 70 which has an output connected to output 89 of controller 46 and to a gate of transistor 36. The reset input of latch 69 is connected to an output of gate 75. A first input of gate 75 is connected to an output of receiver 73 which has an input connected to input 87 of controller 46 and to a first terminal of device 34. A second terminal of device 34 is connected to terminal 19. An output of inverter 67 is commonly connected to a first input of gate 74 and a reset input of latch 79. A Q bar output of latch 79 is connected to a second input of gate 74. A Q output of latch 79 is connected to a base of transistor 81. An emitter of transistor 81 is connected to return 49 and to terminal 19. A collector of transistor 81 is commonly connected to a non-inverting input of comparator 82, a first terminal of current source 80, to output 88, and to a first terminal of capacitor 45. A second terminal of capacitor 45 is connected to return 49. The bit-11 output of counter 55 is connected to a non-inverting input of comparator 56. An inverting input of comparator 56 is connected to a second output of reference 52. The output of comparator 56 is connected to a base of transistor 58. An emitter of transistor 58 is commonly connected to return 49 and a first terminal of capacitor 59. A second terminal of capacitor 59 is commonly connected to a collector of transistor 58, a non-inverting input of comparator 61, and a first terminal of current source 57. A second terminal of current source 57 is connected to input 48. An inverting input of comparator 61 is connected to the third output of reference 52. The output of comparator 61 is commonly connected to a set input of latch 63 and a first input of OR gate 60. The second input of OR gate 60 is connected to a power on reset signal. The output the gate 60 is connected to a reset input of counter 55.

Figure 3:
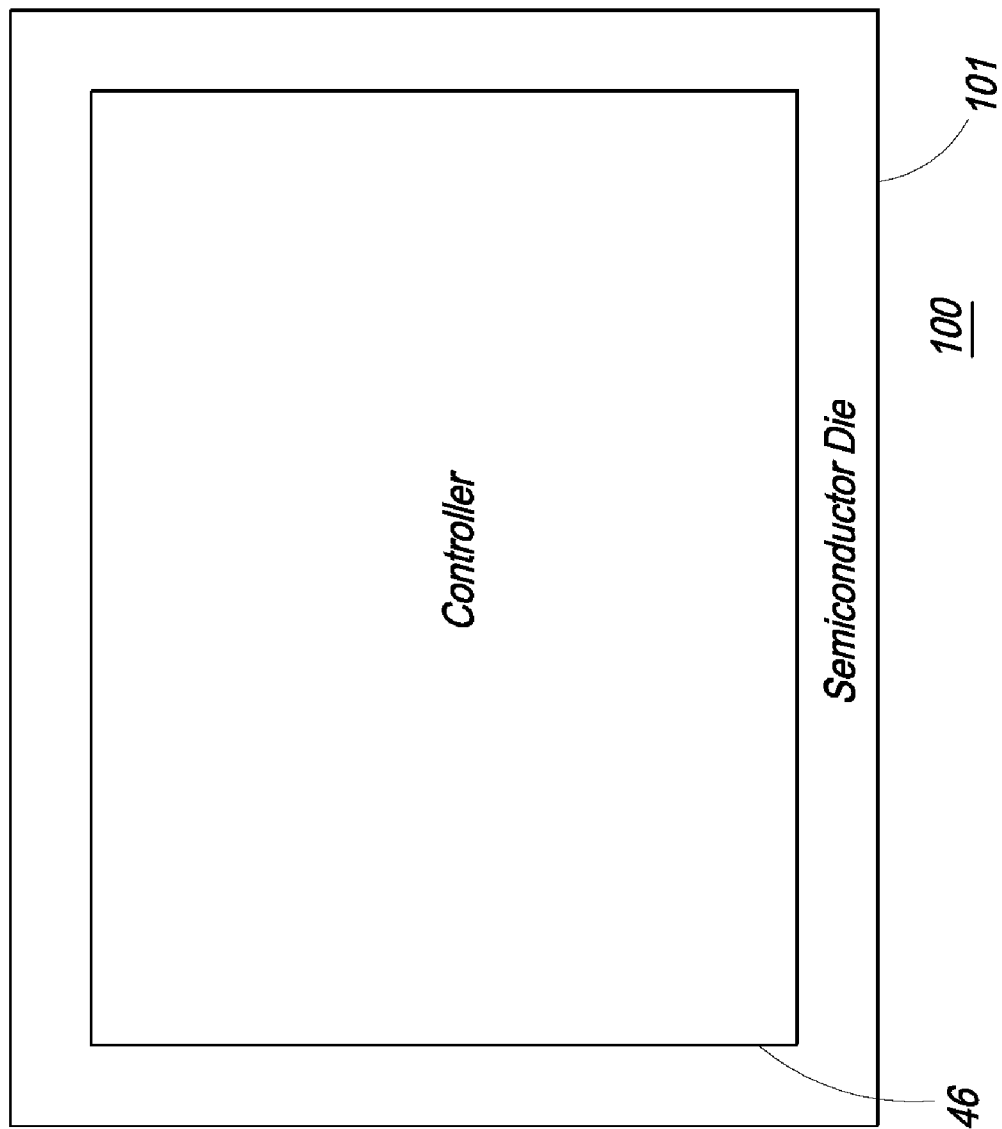
FIG. 3 schematically illustrates an enlarged plan view of a semiconductor device that includes the secondary-side controller of FIG. 1 in accordance with the present invention.

FIG. 3 schematically illustrates an enlarged plan view of a portion of an embodiment of a semiconductor device or integrated circuit 100 that is formed on a semiconductor die 101. Controller 46 is formed on die 101. Die 101 may also include other circuits that are not shown in FIG. 3 for simplicity of the drawing. Controller 46 and device or integrated circuit 100 are formed on die 101 by semiconductor manufacturing techniques that are well known to those skilled in the art.

In view of all of the above, it is evident that a novel device and method is disclosed. Included, among other features, is forming a secondary-side controller to detect a power supply system operating in a burst-mode and to prevent enabling a power transistor that is coupled to a secondary side inductor. Inhibiting the power transistor while operating in the burst-mode improves efficiency.

While the subject matter of the invention is described with specific preferred embodiments, it is evident that many alternatives and variations will be apparent to those skilled in the semiconductor arts. For example, the timer of comparator 56, transistor 58, capacitor 59, and comparator 61 may be replaced by another circuit that forms a re-settable time interval such as an analog timer circuit. Counter 55 may be replace by a different circuit that counts the SN signal transitions. The detailed circuitry of detector 54 may be replaced by another circuit as long as the circuit detects that current was not flowing in inductor 13 at the time that was expected. Additionally, occurrences of the TR signal may be used to detect burst-mode operation instead of the SN signal. Traditionally, the word "connected" is used throughout for clarity of the description, however, it is intended to have the same meaning as the word "coupled". Accordingly, "connected" should be interpreted as including either a direct connection or an indirect connection.

The invention claimed is:

1. A secondary-side power supply controller comprising:
a switching section configured to form a drive signal to drive a power switch that is coupled to an inductor in a secondary-side of a power supply system; and
a burst-mode detector configured to detect the power supply system operating in a burst-mode and responsively inhibit forming the drive signal, the burst-mode detector including a timer configured to form a first time interval responsively to receiving less than a first number of occurrences of a sense signal from the inductor during the first time interval wherein the burst-mode detector is configured to reset the timer responsively to receiving the first number of occurrences of the sense signal prior to an end of the first time interval.

2. The secondary-side power supply controller of claim 1 wherein the switching section includes a control signal detector configured to form a control signal at a first state responsively to current flowing in the inductor.

3. The secondary-side power supply controller of claim 2 wherein the control signal detector is a comparator operably coupled to receive a sense signal from the inductor and form the control signal.

4. The secondary-side power supply controller of claim 2 wherein the switching section includes a latch operably coupled to set a first state of the drive signal responsively to the control signal.

5. The secondary-side power supply controller of claim 4 wherein the latch is operably coupled to set a second state of the drive signal responsively to receiving a switching signal from a primary side of the power supply system.

6. The secondary-side power supply controller of claim 1 wherein a first state of the sense signal is representative of current flowing in the inductor.

7. The secondary-side power supply controller of claim 1 wherein the burst-mode detector includes a counter coupled to count the occurrences of the sense signal.

8. A method of forming a secondary-side controller comprising:
configuring the secondary-side controller to form a drive signal to drive a power switch that is coupled to an inductor in a secondary-side of a power supply system;
configuring the secondary-side controller to detect a burst-mode of operation and responsively inhibit enabling of the power switch including configuring the secondary-side controller to receive a sense signal that is representative of current flow in the inductor;
configuring the secondary-side controller to count occurrences of the sense signal during a first time interval and to set a burst-mode detect signal responsively to receiving the sense signal less than a first number of times during the first time interval; and configuring the secondary-side controller to reset the burst-mode detect signal responsively to receiving the sense signal the first number of times during the first time interval.

9. The method of claim 8 wherein configuring the secondary-side controller to receive the sense signal that is representative of current flow in the inductor includes configuring the secondary-side controller to receive the sense signal that goes to a first state responsively to current flow in the inductor.

10. The method of claim 9 further including configuring a burst-mode detect circuit to count occurrences of the sense signal transitioning to the first state.

11. A method of forming a power supply controller comprising:

configuring a secondary-side switching power supply controller to operate a first power switch that is coupled in a secondary side of a transformer of a power supply system to control current flow through a secondary side inductor of the transformer, the transformer having a primary side inductor wherein a second power switch is coupled to control current flow through the primary side inductor and wherein a primary side switching controller is coupled to operate the second power switch;

configuring the secondary-side switching power supply controller to form a drive signal to drive the first power switch; and configuring the secondary-side switching power supply controller to detect a burst-mode of operation of the primary side switching controller and responsively inhibit enabling the first power switch.

12. The method of claim 11 wherein configuring the secondary-side switching power supply controller to detect the burst-mode of operation of the primary side switching controller includes operably coupling the secondary side switching power supply controller to use occurrences of the current flow through the secondary side inductor to detect the burst-mode operation of the primary side switching controller.

13. The method of claim 12 wherein operably coupling the secondary-side switching power supply controller to use occurrences of the current flow through the secondary side inductor to detect the burst-mode operation of the primary side switching controller includes configuring the secondary-side switching power supply controller to detect initiation of current flow in the secondary side inductor and responsively inhibit forming the drive signal to the first power switch responsively to detecting less than a first number of current flow initiations in the secondary side inductor during a first time interval.

14. The method of claim 13 wherein configuring the secondary-side switching power supply controller to detect initiation of current flow in the secondary side inductor and responsively inhibit forming the drive signal includes coupling a counter to count occurrences of initiation of current flow in the secondary side inductor.

15. The method of claim 13 further including configuring the secondary-side switching power supply controller to use occurrences of the current flowing in the secondary side inductor to form the drive signal to enable the first power transistor.

16. The method of claim 13 further including configuring the secondary-side switching power supply controller to detect initiation of current flow in the secondary side inductor and enable forming the drive signal responsively to detecting the first number of current flow initiations during the first time interval.

* * * * *